G. O. WILMS

ELECTRICAL SWITCH

April 22, 1930.

Re. 17,649

3 Sheets-Sheet 1

Original Filed April 14, 1921

Inventor:
Gustav O. Wilms.

By Ira M. Jones
Attorney.

G. O. WILMS

April 22, 1930. ELECTRICAL SWITCH Re. 17,649

3 Sheets-Sheet 2

Original Filed April 14, 1921

Inventor:
Gustav O. Wilms.
By Ira M. Jones.
Attorney.

April 22, 1930.

G. O. WILMS

ELECTRICAL SWITCH

Re. 17,649

Original Filed April 14, 1921

3 Sheets-Sheet 3

Inventor.

Gustav O. Wilms.

By Ira M. Jones.

Attorney.

Reissued Apr. 22, 1930 Re. 17,649

UNITED STATES PATENT OFFICE

GUSTAV O. WILMS, OF MILWAUKEE, WISCONSIN, ASSIGNOR TO THE RELIANCE COMPANY, OF MILWAUKEE, WISCONSIN, A CORPORATION OF WISCONSIN

ELECTRICAL SWITCH

Original No. 1,629,756, dated May 24, 1927, Serial No. 461,288, filed April 14, 1921. Application for reissue filed March 21, 1929. Serial No. 348,929.

This invention relates to certain new and useful improvements in electrical switches, and refers more particularly to magnetic contactor switches of that type wherein the contacts are closed by magnetic means, but held closed by a mechanical latch or the like, the magnet coils being only energized momentarily.

The present design of switch is particularly adapted for use in switching electrical circuits in churches, theaters, dwellings etc., and in installations where the switches open or close infrequently, but when closed remain so for comparatively long periods of time. Normally, contactor switches similar to the present type are maintained closed magnetically, which is objectionable because of the usual characteristic humming noise and in addition the current consumption is materially increased, in that the coil is energized so long as the switch is in closed position.

Hence it is one of the objects of the present invention to provide an electric switch in which magnet coils are utilized to either open or close the same, thus permitting the operation of the switch from a remote point, but at the same time providing means for mechanically retaining the switch closed, necessitating but a momentary energization of the coils to effect a reduction in the current consumption, as well as eliminate the characteristic humming noise of magnetically held switches.

In mechanically held magnetically operated switches, it is a desirable feature that the magnet coil circuits be automatically opened by a movable member of the switch and for the efficient and positive operation of the switch it is essential that the magnet coil circuits be opened only after the switch has reached either its closed or opened position. Hence with the above in mind, this invention has for one of its objects to provide means connected with a movable switch member for delaying the opening of the magnet coil circuits until after the switch has come to rest in either of its two positions i. e. when the switch is being closed, with the locking latch or the like engaging the same, or when the switch is being opened, until the moving switch parts have passed beyond mechanical locking means.

A further object of this invention is to provide a quick acting switch of the class described in which the movable parts have been reduced to a minimum weight and contain as little mass as possible and to provide means for delaying the opening of the magnet coil circuits whereby the same will serve in the nature of a fly wheel and assure the positive action of the switch in moving to and from closed position.

A still further object of the present invention is to provide a switch of the class described in which the parts thereof may be easily and quickly replaced, and which will be positive in closing, reliable and unlikely to get out of repair.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illlustrated two complete examples of the physical embodiment of my invention constructed according to the best modes I have so far devised for the practical application of the principles thereof, and in which.

Referring now more particularly to the accompanying drawings, in which like numerals designate like parts throughout the several views.

Figure 1:
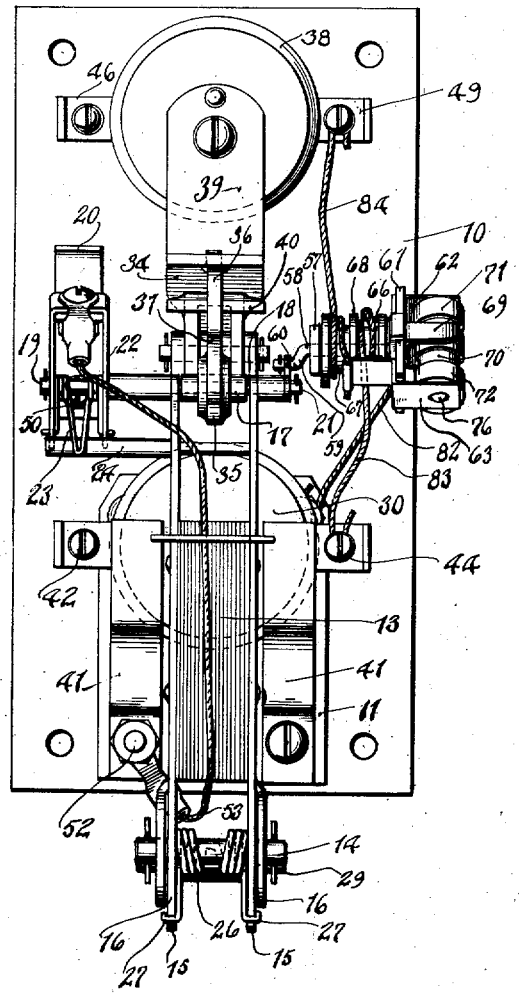
Figure 1 is a front view of a switch construction embodying my invention.

The numeral 10 designates an insulating base or panel having mounted thereon a frame 11 which forms the outside laminæ of a substantially U-shaped core 12, and a laminated armature 13, one end of which is pivotally secured to the frame 11 by a pin 14 which passes through ears 15 carried by the frame and projections 16 formed by extending the outer laminæ of the armature as best shown in Figure 1. The other ends of the outermost laminæ of the armature are also extended and have a roller 17 secured therebetween by a transverse rod or projection 18, one end 19 of which forms a support for a movable switch contact 20, to be later described, and the other end 21 of which forms means for connecting the auxiliary switch, to be later described, with the armature.

The movable contact 20 is made fast to a subtantially U-shaped yoke 22, which has the sides thereof apertured to receive the end 19 of the rod 18, and the end of said yoke carrying contact 20 is at all times yieldingly urged toward the base 10 by a spring 23, which is coiled about the pin 18 medially of the sides of said yoke with its center abutting the top of a projection or rod 24 carried by the armature sides and the ends of which are made fast to the yoke. The movement of the yoke 22, under action of the spring 23, is limited by the ends thereof abutting the projection 24. The movable contact 24 is engageable with a stationary contact 25 which is mounted upon a standard carried by the panel 10, and when the armature is in its full line position depicted in Figure 2, the contacts 20 and 25 will be in positive contact, with the spring 23 under tension.

The armature 13 is normally yieldingly urged outwardly from the panel by a spring 26, the ends 27 of which are engaged over the extended ends 28 of the projections 16 and the medial portion of which is coiled about the pin 14 with its center abutting a rod 29 connecting the inner portions of the ears 15. The rod 29 also serves to limit the outward movement of the armature 13 under the action of its spring 27, as the projections 28 engage said rod when the armature is in its dotted line position depicted in Figure 2. Wound about the upper arm of the core 12 is a closing magnet coil 30, which, when energized, draws the free end of armature 13 toward it with a quick snap movement to engage contacts 20 and 25.

After the armature has been moved to its position closing contacts 20 and 25, it is mechanically held closed by a latch 31, which has its inner end pivotally mounted upon a pin 32 journaled in a bearing bracket 33 carried by a plate 34 secured to the base and having its outer ends provided with oppositely extending portions 35 and 36. The portion 35 has its end surface notched or recessed, as at 37, to engage over and lock behind the roller 17 when the armature is in closed position, and when the armature is in open position the outer end of portion 37 will normally rest upon the roller 17 in order that, upon the closing of the armature, the notch 37 can engage roller 17. The latch 31 is preferably arranged whereby its own weight will engage its projection 37 with the armature to secure the same closed.

The latch member 31 is actuated to release the armature by an opening coil 38 which is wound about a core, not shown, carried by the plate 34, and from which core projects a pole piece 39. The projection or portion 36 of the latch 31 is recessed to receive the free end of an armature 40, which has its inner end pivotally mounted on the pin 32, and when the coil 38 is energized, the armature 40 will be attracted to the pole piece 39, raising the outer end of the latch to permit the opening of the switch.

The closing coil 30 is secured on the arms of the U-shaped core by bracket arms 41 secured to the frame 11, and one terminal 42 of the coil is connected by a conductor 43 with one contact 44′ of a control switch such as a thermostat or the like, the other terminal 44 being connected with one supply line 45 through the improved form of auxiliary or delaying switch, to be later described. The opening coil 38 has one terminal 46 connected with a contact 47 of the control switch by a conductor 48 and its other terminal 49 connected with the supply line 45 through the auxiliary delaying switch. The conductor 45 of the supply lines has one end connected to a terminal 50 of a standard 51, which carries the stationary contact 25. The load line is made fast to a terminal 52 carried by the frame 11 and from which runs a lead 53 to the movable contact 20. The other conductor 54 of the supply lines has a conductor 55 leading therefrom and connected with the movable switch arm or thermostat lever 56 of the control switch.

With this construction, assuming that the terminal 44 of the closing coil 30 is in electrical connection with the supply line 45, the coil 30 will be energized when the switch member 56 makes contact with contact 44′, as a result the armature 13 is attracted to the arms of the core 12 and the contacts 20 and 25 are brought into engagement quickly, thereby completing the circuit to the load, the latch 31 engaging over the roller 17 to lock the switch closed. The coil 30 is deenergized, after the switch has closed, by opening the coil circuit through the medium of an auxiliary switch actuated by movement of the armature, which switch is so arranged and designed as to delay the opening of the coil circuit until after the switch is fully closed and mechanically locked.

With the switch closed, and assuming that the coil 38 has its terminal 49 in electrical connection with the load line 45, an engagement of the control switch member 56 with contact 47 will energize the opening coil and cause the armature 40 to be attracted to the pole piece 39, raising with it the free end of the latch 31 and releasing the armature 13, when the energy of the springs 23 and 26 comes into play to open the contacts 20 and 25 with a quick snap movement to eliminate as much as possible the arcing and pitting therof. It is also desirable that the coil 38 be deenergized after the switch has been opened, but at the same time the deenergization of the coil must not be instantaneous with the attraction of the armature 40 to the pole piece 39, instead the coil must be maintained energized until the armature 13 has practically reached its full open position in order to prevent the possibility of the latch 31 dropping and engaging behind the roller 17 before the force of the springs 23 and 26 have started the opening movement of the switch parts.

The means for delaying the opening of the coil circuits consists of a standard 57 secured to the panel 10 and having a shaft 58 journaled in its upper end, the inner end of which is cranked as at 59 and pivotally receives one end of an insulating link or crank rod 60, the other end of which is pivotally secured to the projected end 21 of the rod 18. Fixed to the outer end of the shaft 58 is an insulated plate 61 provided at its end with spring contacts 62 and 63, the inner ends of which are made fast to the inner face of the plate 61 and then extend inwardly at right angles and are coiled, as at 64 and 65, to overlie the grooves or channels 66 and 67, respectively, of an insulating spool 68 mounted on the shaft 58 intermediate the plate 61 and standard 57.

The plate 61 is also provided with an intermediate spring contact 69 in the form of a U clip to removably secure the auxiliary switch proper in position, which is in the form of a tube 70 of insulating material such as glass or the like and closed at both ends by ferrules or caps 71 and 72, carrying contacts or electrodes 73 and 74, respectively, extending into the interior of the tube. The electrodes 73 and 74 are preferably secured to the caps 71 and 72 by riveting over the outer ends thereof to provide projections 75 and 76 which are adapted to engage in the openings 77 and 78 of the spring contacts 62 and 63 respectively. The tube 70 also has a ferrule or band 79 secured to its central portion which carries a substantially T-shaped current conductor 80, the transverse portion of which is in substantial alignment with the axis of the tube and the longitudinal portion of which is electrically connected to the ferrule 79 as at 81.

The current conductor or electrode 80 is at all times connected with the supply line 45 through the spring contact 69, shaft 58, standard 57, a conductor 82 having one end connected to the standard 57 and its other end connected to frame 11, and then out to the supply line 45. The spring contact 62 has a conductor 83 secured in its end 64 then loosely wound around spool 68, in its channel 66, and connected to the terminal 44 of the closing coil 30. The spring contact 63 is connected with the terminal 49 of the coil 38 by a conductor 84 which is loosely wound about the spool 68, in its channel 67 and is then secured to the end 65 of the clip. The tube 70 is filled with sufficient mercury 85 to touch the electrode 74 and the end 86 of the conductor 80, when the tube and switch parts are in their full line positions depicted in Figures 1 and 2. When the tube is in its dotted position in Figure 2, the mercury 85 touches and electrically connects the electrode 73 and the end 87 of the connector 80.

Figure 2:
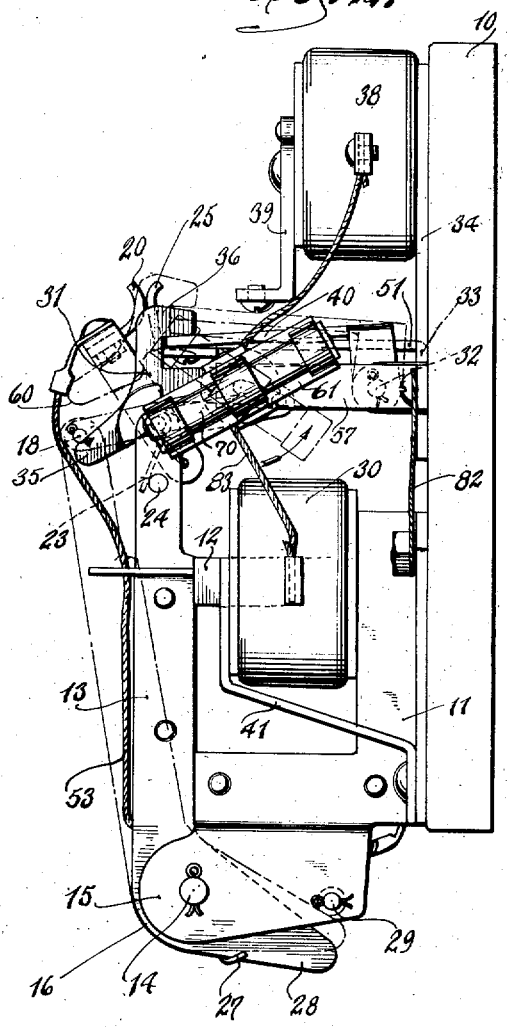
Figure 2 is a side view thereof.
Figure 3:
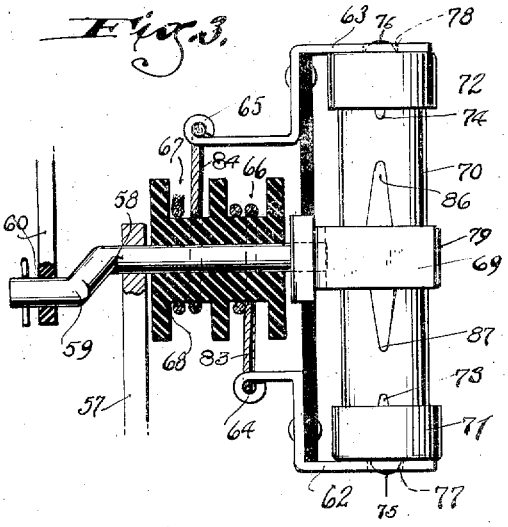
Figure 3 is an enlarged fragmentary view, with parts in elevation and parts in section, illustrating my improved form of auxiliary switch construction.
Figure 4:
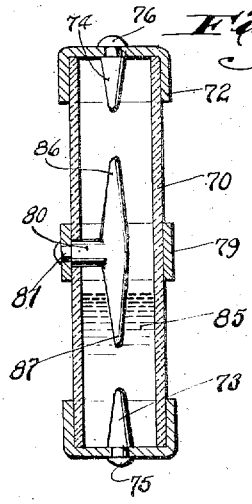
Figure 4 is a sectional view taken longitudinally through the removable tube member of the auxiliary or delaying switch, the electrodes being in elevation.
Figure 5:
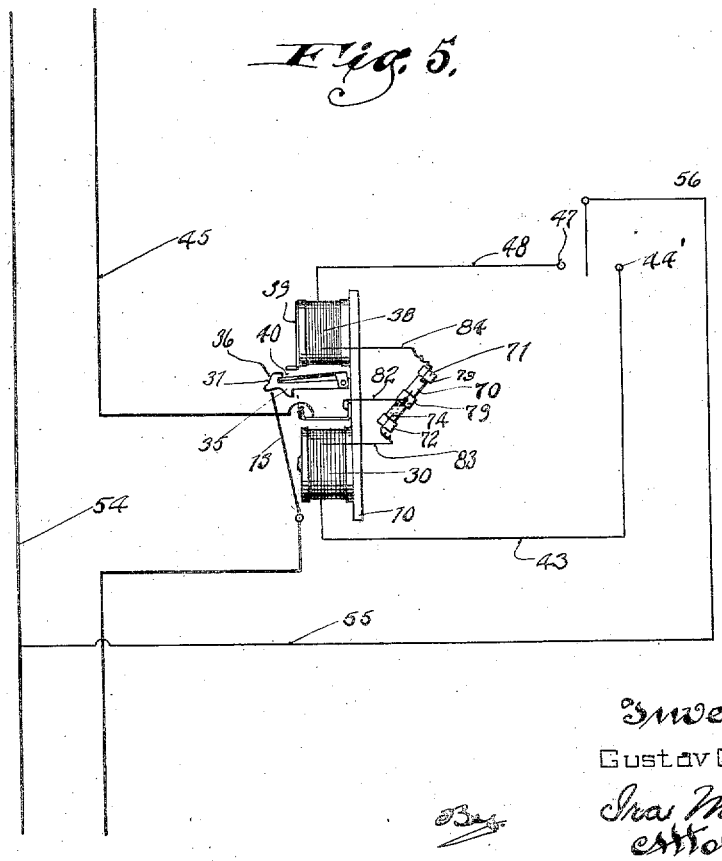
Figure 5 is a diagrammatic view illustrating the circuits of the switch actuating magnet coils.

With the switch open, see dotted line position in Figure 2, the tube 70 will be inclined with the ferrule 71 beneath the ferrule 72, as a result of which the mercury 85 electrically connects electrode 73 with electrode 80, and the side 44 of the coil 30 is in electrical connection with the load line 45. With the parts in these positions, an engagement of the control switch member 56 with contact 44′ will electrically connect the side 44 of the coil 30 with the load line 54, when the coil 30 will be energized to attract the armature 13 and close the switch.

As the armature moves inwardly the tube 70 is rotated in the direction of the arrow in Figure 2, but the action of the mercury 85 in electrically disconnecting electrodes 73 and 80 is delayed due to the inertia of the mercury, the adhesion between the mercury and the inside walls of the glass tube and the centrifugal force which tends to retain the mercury at the end of the tube. By reason of these factors, the armature comes to rest with a quick snap in its closed position and the latch 31 mechanically secures the same. When the armature has come to rest in its closed position, the abrupt arresting of the rotary movement of the tube 70 permits the mercury to run to the other end thereof, which is now beneath the horizontal, thus electrically disconnecting electrodes 73 and 80.

The mercury 85 now electrically connects the electrodes 74 and 80 and the side 49 of the opening coil 38 is in electrical connection with the supply line 45, so that when the control switch member 56 is engaged with contact 47, the side 46 of the coil is electrically connected with the other supply line 54 and the coil energized to attract armature 40 toward its pole piece 39 and release the armature 13 and permit its movement to open position. The tube 70 is rotated in a direction reverse to the arrow in Figure 2 when the switch is being opened and the opening of the circuit of coil 38 is delayed in the same manner hereinbefore described in connection with the closing of the switch. The travel of the auxiliary or mercury switch, in degrees, is much greater than that of the armature 13, as a result of which the peripheral speed of the mercury switch is materially increased.

By the use of the auxiliary switch hereinbefore described, it is possible to reduce the mass of the switch parts to a minimum as the tube 70 and plate 61 have a fly-wheel effect to assist in the closing of the switch.

Figure 6:
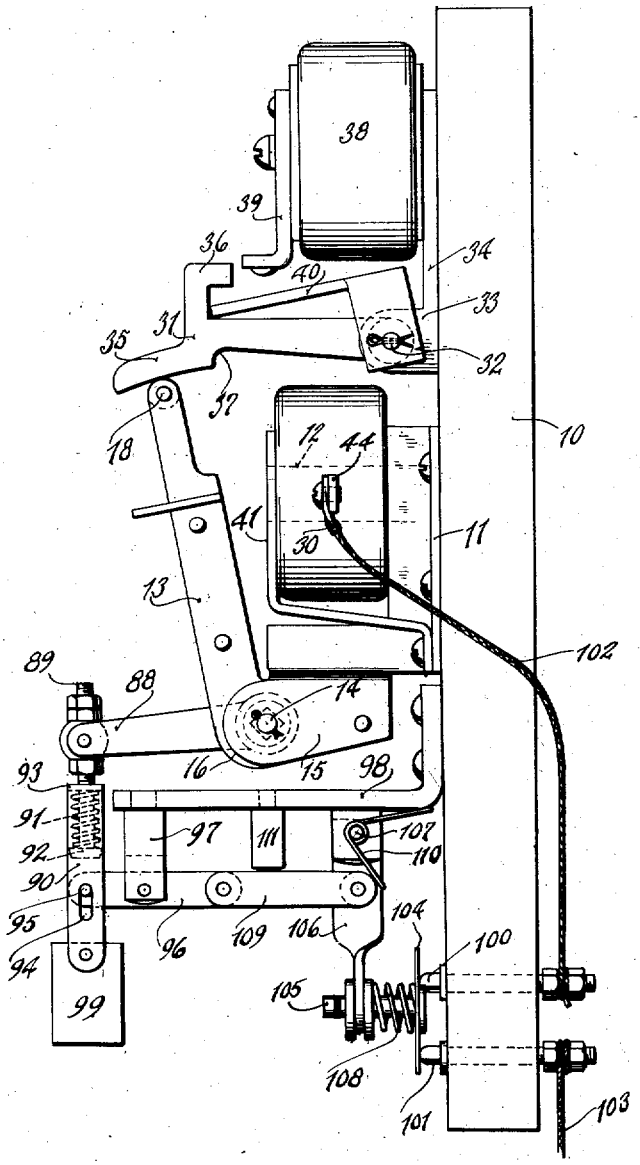
Figure 6 is a side elevational view of a modified form of switch construction utilizing the same general principle for delaying the opening of the closing magnet coil circuit while the switch is being closed.

In Figure 6, I have illustrated a slightly modified embodiment of my invention in which inertia means are also utilized to delay the opening of the closing coil circuits. In this form of my invention the armature 13 carries an arm 88 adjacent its pivot, the outer end of which is pivotally connected to a bolt or rod 89 which is passed through an opening in the closed end of a substantially U-shaped member 90 and is yieldably restrained from movement in one direction by a spring 91 coiled about the bolt 89 and between the head 92 thereof and the closed end 93 of said yoke member.

The yoke member 90 has its sides correspondingly slotted as at 94 to receive a pin 95 carried by the outer end of a lever 96 which is medially pivotally secured to the post 97 carried by a standard 98 supported from the panel 10. With the switch in open position, the yoke member 90 will be at its lower limit of movement with the pin 90 at the upper ends of the slots 94 and the spring 91 extended, but maintained under a tension by a weight 99 confined between the outer free ends of the yoke member.

The panel 10 has two contacts 100 and 101 carried thereby adjacent the standard 98, and the contact 100 is connected with the side 44 of the coil 30 by a conductor 102 and the contact 101 is connected to the supply line 45 by a conductor 103. The contacts 100 and 101 are electrically connected, when the switch is open by a disk 104 which is mounted on the end of a rod 105 slidably mounted in the free end of a lever 106 having its inner end journaled as at 107 to the standard 98. A positive contact between the disk and the contacts 100 and 101 is assured by an extensile spring 108 coiled about the rod 105 and confined between the disk and the lever 106. The inner end of lever 96 has one end of a link 109 pivotally connected therewith, the other end of which is medially pivotally connected with the lever 106. With this construction, the lever 96 and link 109 are either in longitudinal alignment or else have their inner ends slightly past dead center when the switch is open and are maintained in this position by a spring 110, one end of which engages the standard 98 and the other the inner end of link 109, a stop 111 limiting the movement of the center connection of the lever 106 and the link 109 past center.

With this construction, when the circuit of the coil 30 is closed by the control lever 56 engaging contact 44′, the coil 30 is energized and the armature drawn inwardly with a snappy positive movement and by reason of its connection with the lever 88 the rod 89 will be also raised with the quick snappy movement. By reason of the inertia of the weight 99, the yoke member 90 will remain practically stationary and the rod 89 will move upwardly compressing spring 91, until sufficient energy is stored in the spring 91 to overcome the inertia of the weight 99. By the time the armature 13 has reached its closed position and is mechanically held by the latch 31, the yoke member 90 will be moved upwardly by the force of the spring 91 until the lower face of slot 94 engages pin 95, rocking the lever 96 on its central pivot to shorten the distance between the standard 97 and the pivotal connection between lever 106 and link 109 to disconnect contacts 100 and 101.

While in the foregoing description and accompanying drawings, the contacts 20 and 25 have been described and illustrated as being actuated to close a circuit when the delaying action of opening the coil 30 circuit takes place, it will be obvious that the action may be reversed where the construction is such that the contacts 20 and 25 are electrically disconnected when the coil 30 is energized.

I claim:

1. An electric switch of the class described comprising a movable armature, an electromagnet acting on said armature, a switch for connecting said electromagnet with an electric supply circuit, and a delaying means arranged to retard the action of said switch, said delaying means being rendered inactive substantially immediately upon the armature reaching a point of rest.

2. In a mechanically held electric switch, a switch member movable to and from closing position, a magnet coil for said member included within an electric circuit, and means operable by said switch member for opening the magnet coil circuit, said means including parts, the inertia of which tend to delay the opening of said circuit.

3. In a mechanically held magnetic switch, a movable member, a magnet coil operable, upon being energized, to actuate the switch, and means operable by a closing movement of said member to open the circuit of said coil, the inertia of said means tending to delay the opening of said magnet coil circuit.

4. In an electric switch, a movable member adapted to be actuated upon an opening and closing of the switch, means for releasably securing the switch in closed position, a magnet coil operable upon the closing of its circuit to release said switch securing means, and means operable by an opening movement of said switch member for opening the circuit of said magnet coil, the inertia of said last mentioned means tending to delay the opening of said magnet coil circuit.

5. In a mechanically held magnetic switch, a member movable to and from closing position, a closing magnet coil, releasable means for retaining the switch closed, a tripping magnet coil for said means, said coils being included within suitable electric circuits, and means operable by said switch member for opening and closing the magnet coil circuits to render the closing and tripping coils inoperative as the switch is closed and opened, respectively.

6. In a mechanically held magnetic switch, a member movable to and from closing position, a closing magnet coil, releasable means for retaining the switch closed, a tripping magnet coil for said means, said coils being included within suitable electric circuits, and means operable by said switch member for opening and closing the circuits of said magnet coils, said last mentioned means including parts the inertia of which tends to delay the opening and closing of said coil circuits.

7. In a mechanically held magnetic switch, a switch closing magnet coil, means for releasably holding the switch closed, a coil included within a circuit and adapted upon the completion of the circuit to close the switch, and an auxiliary switch for opening the coil circuit to render the same inoperative, said auxiliary switch consisting of a supporting means, a connection between the switch and the supporting means whereby actuation of the switch imparts a rotary movement to the supporting means, fixed contacts carried by said supporting means and a shifting contact carried by the supporting means and arranged to electrically connect and disconnect said fixed contacts, adhesion, and friction between the shifting contact and supporting means and the inertia of the shifting contact itself resulting in a resistance to any force tending to set the same in motion upon rotation of the supporting means by actuation of the switch to appreciably delay the action thereof.

8. In an electric switch, a switch member movable to and from closing position as the switch is actuated, a control magnet coil for the switch included within a circuit which when closed will energize the magnet coil and move the switch to one of its positions and when opened will deenergize the coil when the switch has moved to its other position, and an auxiliary switch operable by said movable member for opening said circuit after the switch has come to rest in one of its two positions said auxiliary switch including a rotary member whereby the motion thereof will impart an added momentum to the movable member of the switch in its movements from one position to another.

9. In an electric switch, a switch member movable to and from closing position as the switch is actuated, a control magnet coil for the switch included within a circuit which when closed will energize the magnet coil and move the switch to one of its positions and when opened will deenergize the coil when the switch has moved to its other position, a shaft rotatably mounted adjacent the movable switch member, a connection between the movable switch member and the shaft whereby the same is rotated by movement of said switch member, and an auxiliary switch operable by rotation of said shaft to open said circuit after the switch has come to rest in one of its two positions.

10. In an electric switch, a switch member movable to and from closing position as the switch is actuated, a control magnet coil for the switch included within a circuit which when closed will energize the magnet coil and move the switch to one of its positions and adapted to be de-energized when the switch has moved to its other position, a shaft rotatably mounted adjacent the switch member, means connecting said shaft with the switch member whereby movement of said member rotates the shaft, and an auxiliary switch readily detachably connected with the shaft and operable by rotation thereof to open said circuit after the switch has come to rest in one of its two positions.

11. In an electric switch, a switch member movable to and from closing position as the switch is actuated, a control magnet coil for the switch included within a circuit which when closed will energize the magnet coil and move the switch to one of its positions and adapted to be de-energized when the switch has moved to its other position, a shaft rotatably mounted adjacent the switch member, a crank arm on said shaft, a link connecting the crank arm with the switch member whereby movement of the switch member rotates said shaft, and an auxiliary switch actuated by rotation of said shaft to open the circuit after the switch has come to rest in one of its two positions.

12. In an electrical switch, a switch member movable to and from closing position as the switch is actuated, electrical means for actuating the switch member, a rotatably mounted plate member, means connecting the plate member with the switch member whereby actuation of the switch member rotates the same, a cartridge-type circuit making and breaking device detachably mounted on the plate, and said switch actuating and circuit making and breaking device being included within suitable electrical circuits whereby actuation of the switch member will make and break the circuits of the said switch actuating means in said cartridge-type circuit making and breaking device.

13. An electrically operated circuit controlling device comprising a movable switch member, electro-responsive operating means for quickly operating the movable switch member between two positions, contact mechanism operated by the switch member for controlling the said operating means, and inertia means for delaying operation of the said contact mechanism to control the said operating means upon a quick movement of the switch member from each of said positions to the other.

14. An electrically operated circuit controlling device comprising a movable switch member, an electro-responsive operating means for quickly operating the movable switch member between two positions, and fluid contact means operated by the switch member for controlling the said operating means and having such inertia as to operate a time interval after the quick operation of said switch member from each of said positions to the other.

15. An electrically operated circuit controlling device comprising a circuit controlling element movable in the arc of a circle from one position to another position, a relatively movable circuit controlling element operable into circuit closing engagement with said first element in said one position and having such inertia as to be moved integrally therewith by centrifugal force upon a quick movement of said first element from said one position to the other position and thereby being biased to move out of circuit closing engagement with said first element, and electro-responsive means for quickly operating said first element from said one position to the other position connected to be energized through said circuit controlling elements whereby the said means is maintained energized until after the completion of the operation of said first element to said other position.

16. An electrically operated circuit controlling device comprising a movable container operable to a plurality of positions and having a plurality of contacts disposed in spaced relation, a conducting fluid in said container the said fluid being biased into circuit closing engagement with a corresponding one of the said contacts in each position of the container and having such inertia as to temporarily remain in circuit closing engagement with the corresponding contact upon the operation of said container from each of said positions to another of said positions, and electro-responsive means for operating the said container from each of said positions to the other, the said means being connected to be energized through said conducting fluid and the corresponding contact whereby the said means is maintained energized during and until after completion of the operation of said container from each of said positions to another of said positions.

In testimony whereof I have hereunto affixed my signature.

GUSTAV O. WILMS.